United States Patent
Benke et al.

(10) Patent No.: US 11,360,866 B2
(45) Date of Patent: Jun. 14, 2022

(54) UPDATING STATEFUL SYSTEM IN SERVER CLUSTER

(71) Applicant: INTERNATIONAL BUSINESS MACHINES CORPORATION, Armonk, NY (US)

(72) Inventors: Oliver Benke, Stuttgart (DE); Tobias Ulrich Bergmann, Weinstadt (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 16/848,135

(22) Filed: Apr. 14, 2020

(65) Prior Publication Data
US 2021/0318938 A1    Oct. 14, 2021

(51) Int. Cl.
*G06F 11/20* (2006.01)
*H04L 67/1001* (2022.01)
(Continued)

(52) U.S. Cl.
CPC ........ *G06F 11/2056* (2013.01); *G06F 11/201* (2013.01); *G06F 16/235* (2019.01);
(Continued)

(58) Field of Classification Search
CPC .. G06F 11/2056; G06F 16/235; G06F 11/201; G06F 11/2082; G06F 11/2076;
(Continued)

(56) References Cited

U.S. PATENT DOCUMENTS 6,304,882 B1 * 10/2001 Strellis ................ G06F 11/2064
714/E11.107
8,326,800 B2    12/2012 Cunningham
(Continued)

FOREIGN PATENT DOCUMENTS

CN        106021566 A   * 10/2016

OTHER PUBLICATIONS

Amazon, "Database Engine Upates for Amazon Aurora MySQL," Amazon Aurora User Guide for Aurora, URL: https://docs.aws.amazon.com/AmazonRDS/latest/AuroraUserGuide/AuroraMySQL.Updates.html. Retrieved Jan. 21, 2020. pp. 744-747.
(Continued)

*Primary Examiner* — Hitesh Patel
*Assistant Examiner* — Vinh Nguyen
(74) *Attorney, Agent, or Firm* — Cantor Colburn LLP; Edward Wixted

(57) ABSTRACT

A computer-implemented method for seamlessly performing a maintenance operation on a stateful system includes mapping a network address of the stateful system to a primary server that uses a primary database to respond to incoming data requests. In response to receiving a maintenance request, the primary database is replicated to a secondary database of a secondary server. The secondary server is updated according to the maintenance request. The method further includes caching, in a replay buffer of the primary server, incoming data requests during the replicating. After the replicating, the data requests from the replay buffer are executed by the secondary server. Write operations to the primary server are disabled during the replicating, and the network address of the stateful system is mapped to the secondary server. Subsequently, the primary server is updated and reinstated by mapping the network address, and enabling the write operations.

14 Claims, 6 Drawing Sheets

(51) Int. Cl.
*H04L 101/622* (2022.01)
*H04L 61/2503* (2022.01)
*G06F 16/23* (2019.01)

(52) U.S. Cl.
CPC ...... *H04L 61/2503* (2013.01); *H04L 61/6022* (2013.01); *H04L 67/1002* (2013.01)

(58) Field of Classification Search
CPC .......... G06F 16/24; G06F 11/20; G06F 16/27; G06F 11/2023; G06F 11/2092; G06F 11/2089; H04L 61/2503; H04L 61/6022; H04L 67/1002; H04N 21/4332
See application file for complete search history.

(56) References Cited

U.S. PATENT DOCUMENTS

| | | | | |
|---|---|---|---|---|
| 8,843,441 | B1* | 9/2014 | Rath | G06F 16/273 707/614 |
| 8,909,977 | B2* | 12/2014 | Morosan | G06F 11/2097 714/4.11 |
| 9,268,811 | B1* | 2/2016 | Thakur | G06F 16/2358 |
| 9,336,292 | B2* | 5/2016 | McAlister | H04L 67/1095 |
| 9,501,543 | B2* | 11/2016 | Marsden | G06F 16/273 |
| 9,639,448 | B2 | 5/2017 | Gebhard | |
| 9,720,951 | B2 | 8/2017 | Yancey | |
| 2009/0006888 | A1* | 1/2009 | Bernhard | G06F 11/08 714/6.12 |
| 2013/0173541 | A1* | 7/2013 | Iyer | G06F 16/213 707/625 |
| 2014/0068040 | A1* | 3/2014 | Neti | G06F 9/485 709/223 |
| 2014/0351214 | A1* | 11/2014 | Abercrombie | G06F 16/137 707/626 |
| 2015/0113222 | A1* | 4/2015 | Naik | G06F 12/0808 711/133 |
| 2016/0063048 | A1* | 3/2016 | Yancey | G06F 11/14 707/619 |
| 2017/0230261 | A1* | 8/2017 | Gong | H04L 43/10 |
| 2018/0336258 | A1* | 11/2018 | Lee | G06F 16/2358 |
| 2019/0220269 | A1* | 7/2019 | Baset | G06F 9/45558 |
| 2019/0251180 | A1 | 8/2019 | Lachambre | |
| 2020/0067761 | A1* | 2/2020 | Schmitt | G06F 11/2025 |
| 2020/0097556 | A1* | 3/2020 | Chen | G06F 9/5077 |
| 2020/0110674 | A1* | 4/2020 | Kim | G06F 11/2035 |
| 2020/0218617 | A1* | 7/2020 | Knestele | G06F 9/5027 |
| 2021/0034477 | A1* | 2/2021 | Pederson | G06F 11/1451 |
| 2021/0073089 | A1* | 3/2021 | Sathavalli | G06F 3/0619 |

OTHER PUBLICATIONS

Oracle, "Zero Downtime Patching," OPatch User Guide, URL: https://docs.oracle.com/cd/E24628_01/doc.121/e39376/zero_downtime.htm#CBBCJDAH. Retrieved Jan. 21, 2020. 5 pages.

* cited by examiner

UPDATING STATEFUL SYSTEM IN SERVER CLUSTER

BACKGROUND

The present invention generally relates to computing technology, and more particularly to improving how a stateful system, such as a database management system (DBMS), is updated by facilitating such updates without any outage visible to any clients that are using the stateful system.

A system that can include software, hardware, or a combination thereof can be stateful or stateless. When a system is "stateful," it stores client data from a session until the session completes, i.e., a client logs out, or a session expires (e.g., after a predetermined time limit). The client data that is stored is accessible to the system, to the client, and, in one or more examples, to other applications after the session has completed. Accordingly, a stateful system is a system that saves client data from one or more activities of one session for use in the next session. The data that is saved can be referred to as a state of the system. Examples of stateful systems include operating systems, DBMSs, various desktop applications, etc. "Stateless" systems, on the other hand, are systems that do not save any client data from one session to another.

SUMMARY

According to one or more embodiments of the present invention, a computer-implemented method facilitates seamlessly performing a maintenance operation on a stateful system, such as a database management system. The computer-implemented method includes mapping a network address of the stateful system to a primary server that uses a primary database to respond to incoming data requests to the stateful system, the incoming data requests being directed to the primary server because of the mapping. Further, in response to receiving a maintenance request for the stateful system, the primary database is replicated to a secondary database of a secondary server. The secondary server is updated according to the maintenance request. The method further includes caching, in a replay buffer of the primary server, subsequent incoming data requests that are received during the replicating. After the replicating, the incoming data requests from the replay buffer are executed by the secondary server using the secondary database. At the time to switch to the secondary server, write operations to the primary server are disabled. Further, the network address of the stateful system is mapped to the secondary server for directing the incoming data requests to the secondary server. Further yet, the primary server is updated according to the maintenance request. Subsequently, the primary server is reinstated by mapping the network address of the stateful system to the primary server and enabling the write operations.

According to one or more embodiments of the present invention, a stateful system includes a primary server, a secondary server, and at least one processing unit coupled with the primary server and the secondary server, the at least one processing unit is performs a method for seamlessly performing a maintenance operation on the stateful system. The method includes mapping a network address of the stateful system to a primary server that uses a primary database to respond to incoming data requests to the stateful system, the incoming data requests being directed to the primary server because of the mapping. Further, in response to receiving a maintenance request for the stateful system, the primary database is replicated to a secondary database of a secondary server. The secondary server is updated according to the maintenance request. The method further includes caching, in a replay buffer of the primary server, subsequent incoming data requests that are received during the replicating. After the replicating, the incoming data requests from the replay buffer are executed by the secondary server using the secondary database. At the time to switch to the secondary server, write operations to the primary server are disabled. Further, the network address of the stateful system is mapped to the secondary server for directing the incoming data requests to the secondary server. Further yet, the primary server is updated according to the maintenance request. Subsequently, the primary server is reinstated by mapping the network address of the stateful system to the primary server and enabling the write operations.

According to one or more embodiments of the present invention, a computer program product for seamlessly performing a maintenance operation on a stateful system includes a storage medium readable by one or more processing circuits. The storage medium stores instructions executable by the one or more processing circuits to cause a method to be performed for seamlessly performing the maintenance operation on the stateful system. The method includes mapping a network address of the stateful system to a primary server that uses a primary database to respond to incoming data requests to the stateful system, the incoming data requests being directed to the primary server because of the mapping. Further, in response to receiving a maintenance request for the stateful system, the primary database is replicated to a secondary database of a secondary server. The secondary server is updated according to the maintenance request. The method further includes caching, in a replay buffer of the primary server, subsequent incoming data requests that are received during the replicating. After the replicating, the incoming data requests from the replay buffer are executed by the secondary server using the secondary database. At the time to switch to the secondary server, write operations to the primary server are disabled. Further, the network address of the stateful system is mapped to the secondary server for directing the incoming data requests to the secondary server. Further yet, the primary server is updated according to the maintenance request. Subsequently, the primary server is reinstated by mapping the network address of the stateful system to the primary server and enabling the write operations.

Additional technical features and benefits are realized through the techniques of the present invention. Embodiments and aspects of the invention are described in detail herein and are considered a part of the claimed subject matter. For a better understanding, refer to the detailed description and to the drawings.

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describe having a communications path between two elements and do not imply a direct connection between the elements with no intervening elements/connections between them. All of these variations are considered parts of the specification.

DETAILED DESCRIPTION

One or more embodiments of the present invention address the technical challenge of updating or changing a stateful computer system that is being accessed by one or more clients without any outage visible to the clients. Embodiments of the present invention are described using a database management system (DBMS) that is being executed in a server cluster as an example of a stateful system that is being accessed by several clients. However, it is understood that in other embodiments of the present invention, the stateful system can be any other type of system. Embodiments of the present invention facilitate updating a DBMS by temporarily using secondary resources without DBMS awareness.

Figure 1:
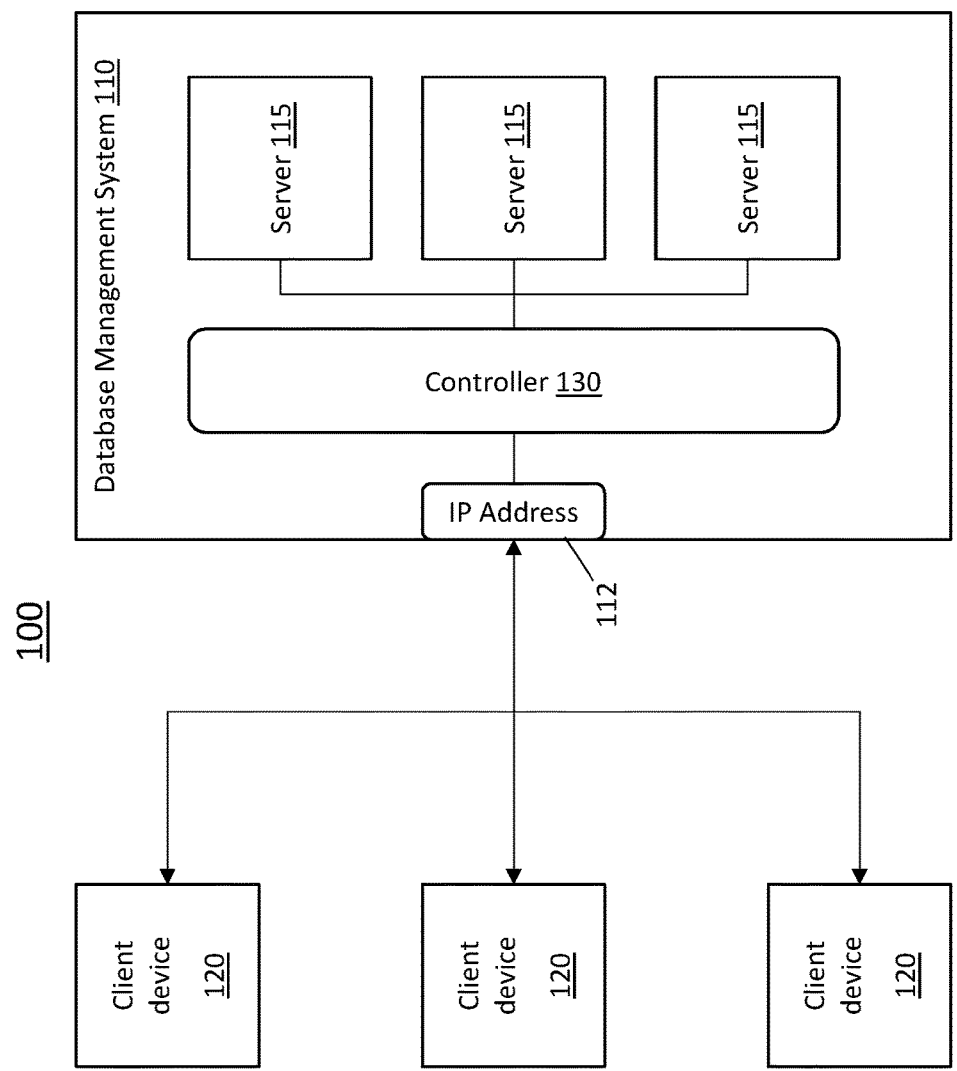
FIG. 1 depicts a block diagram of a database management system (DBMS)

FIG. 1 depicts a block diagram of an example DBMS system according to one or more embodiments of the present invention. A system 100 includes a DBMS system 110 that is accessed by one or more client devices 120 to read/write data. The DBMS system 110 is a server cluster and includes multiple servers 115. It is understood that in one or more embodiments of the present invention, the DBMS 110 can include a different number of servers 115 than those depicted in FIG. 1. A server 115 stores a copy of a database (not shown) that includes data that is being accessed by one or more client devices 120. The database can be a relational database or any other type of database that stores the data that can be accessed by the one or more client devices 120 using a predetermined protocol and/or application programming interface (API).

A client device 120 is an electronic device, such as a computer, a laptop, a desktop, a computer server, a tablet computer, a phone, or any other type of electronic device that stores and/or retrieves data to/from the DBMS 110. The client device 120 can access the DBMS 110 via a communication address, such as an Internet Protocol (IP) address 112 that is assigned to the DBMS 110. The client device 120 is not aware of which computer server 115 within the DBMS 110 handles one or more instructions/requests that the client device 120 sends to the DBMS 110. In other words, the DBMS 110 makes handling of the storage/retrieval requests from the client device 120 transparent without the client device 120 having to know about the architecture of the server cluster, for example, that is made up using the servers 115 within the DBMS 110. For example, the DBMS 110 can include two, three, seven, or any other number of servers 115, however, for the client device 120, the data requests are sent to the DBMS 110 via the single unique IP address 112, and responses to those requests are received from the DBMS 110 via the same IP address 112.

A technical challenge with updating the DBMS 110, as noted herein, is that the servers 115 and hence, the corresponding databases, have to be taken offline until the update is completed. This results in downtime for the client devices 120. Such downtime can be for some seconds, for example, 20-30 seconds, to minutes, and even hours in some cases. Any such downtime can have business or health-related impacts, particularly, when the DBMS 110 is being used in fields such as banking, e-commerce, health-care, and various other such mission-critical areas. Such downtime is undesirable even in other areas where the DBMS 110 can be used, such as streaming media, online games, news distribution, communication services, and the like. Further, the DBMS 110 has to be online throughout the day, regardless of active traffic, peak times, etc. Typically, the DBMS 110 cannot be updated without downtime because the database has to be reorganized after an update. Such reorganizations can be a time-consuming process.

Embodiments of the present invention facilitate applying software updates to the DBMS 110 without any outage even if the DBMS software itself, executing on the DBMS 110, is not capable of performing an update without an outage. Accordingly, embodiments of the present invention improve the update process of the DBMS 110. In addition, in one or more embodiments of the present invention, the update is performed on the servers 115 concurrently, reducing the time required for reorganizing the databases, if required. In this manner, the overall duration of the update is also reduced. Embodiments of the present invention, accordingly, improve the operation of the DBMS 110, and hence, provide improvements to computing technology. Further, embodiments of the present invention provide a practical application to improve the efficiency of updating a DBMS.

In one or more embodiments of the present invention, the DBMS 110 is associated with a controller 130. The controller 130 can be a computing device, such as a desktop computer, a server computer, a laptop computer, a tablet computer, or any other computing device with one or more processors that can control one or more operations of the DBMS 110. Although in the example of FIG. 1, controller 130 is depicted in the DBMS 110, in other examples, the controller 130 can be external to the DBMS 110. In one or more embodiments of the present invention, the controller 130 can be a processing unit of one of the servers 115.

Figure 2:
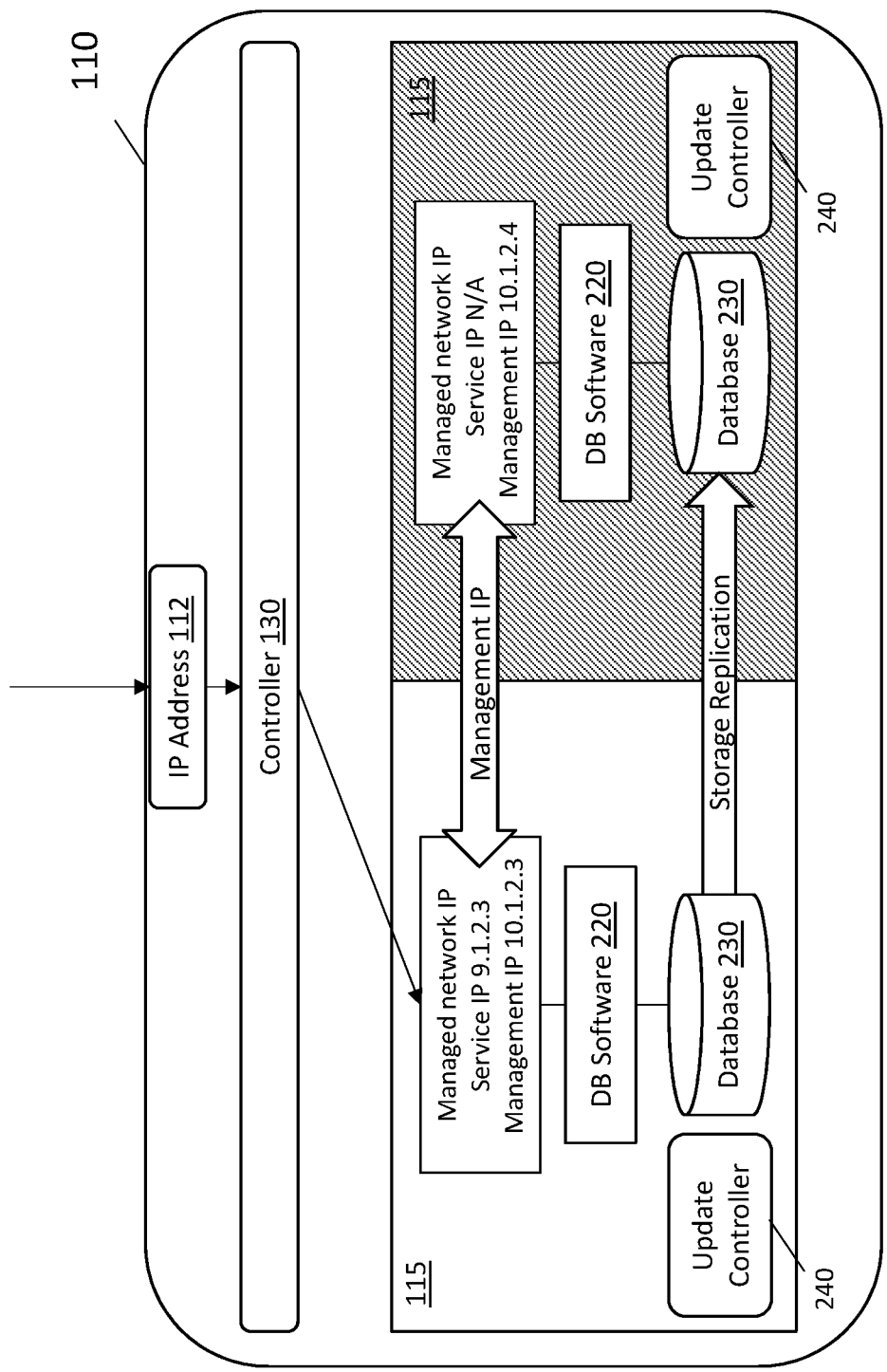
FIG. 2 depicts a block diagram of an architecture of a DBMS to apply software updates concurrently and without any outage according to one or more embodiments of the present invention.

FIG. 2 depicts a block diagram of an architecture of the DBMS 110 to apply software updates concurrently and without any outage according to one or more embodiments of the present invention. The controller 130 receives client data requests from one or more client devices 120 via one or more communication ports assigned the IP address 112. The controller 130 manages an internal network among the cluster of servers 115. As part of the internal network, the controller 130 maps the IP address 112 (service IP=9.1.2.3 in the example of FIG. 2) to a server 115, which has an internal IP address (management IP=10.1.2.3 in the example of FIG. 2). It is understood that the IP address examples depicted and used herein can vary in one or more embodiments of the present invention.

As depicted in FIG. 2, another server 115 can have a different internal IP address (e.g., 10.1.2.4), which is not mapped to the service IP address 112 of the DBMS 110. The server 115 that is mapped to the service IP address 112 is referred to as a "primary server," and any other server 115 from the cluster can be referred to as a "secondary server" herein. However, it is understood that the servers 115 can be referred to with other labels in one or more embodiments of the present invention. In this manner, the controller 130 forwards the received client data requests to the primary server 115 via the mapped IP address. In one or more embodiments of the present invention, the secondary server 115 can be an external server that is not part of the DBMS 110 but, however, is coupled with the DBMS 110 via a communication network.

The primary server 115 has database software 220 that is responsible for processing the client data request and storing/retrieving client data as per the client data request. The database software 220 can be DB2®, MongoDB®, or any other such database management software. The client data request can be in a language such as structured query language (SQL), contextual query language (CQL), cipher, language integrated query language (LING), and other such query languages or any other language that facilitates storage/retrieval of client data. The database software 220 stores/retrieves the client data to/from a database 230.

The servers 115 further include an update controller 240. The update controller can be a hardware module, a software module, or a combination thereof. The update controller 240 manages to update the database software of a server 115 which the update controller 240 is a part of. The update controller 240 of the primary server 115 communicates with the update controller 240 of the secondary server 115 to facilitate updating the primary server 115 without any outage for the client devices 120.

Figure 3:
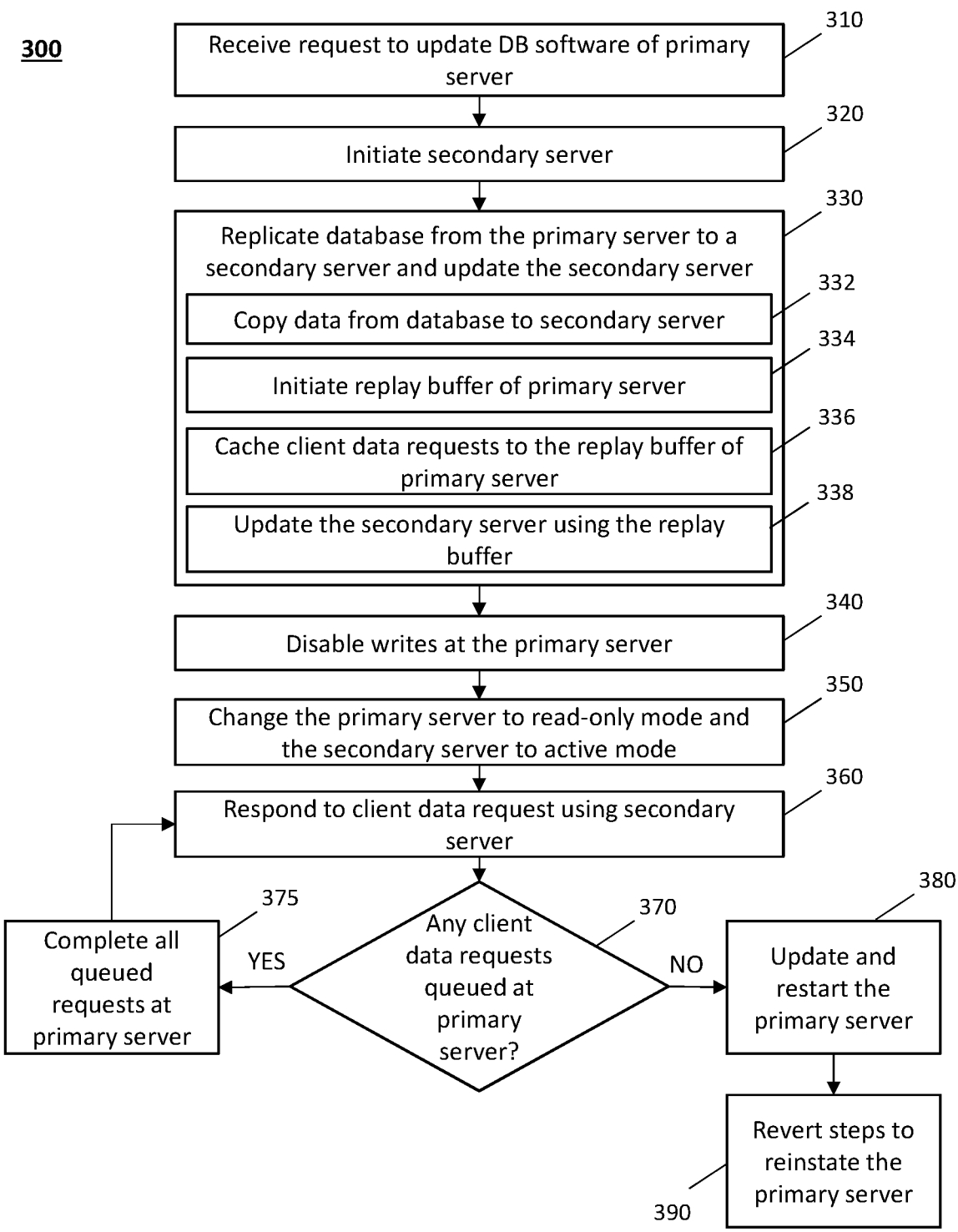
FIG. 3 depicts a flowchart of a method for applying software updates without any outage according to one or more embodiments of the present invention.
Figure 4:
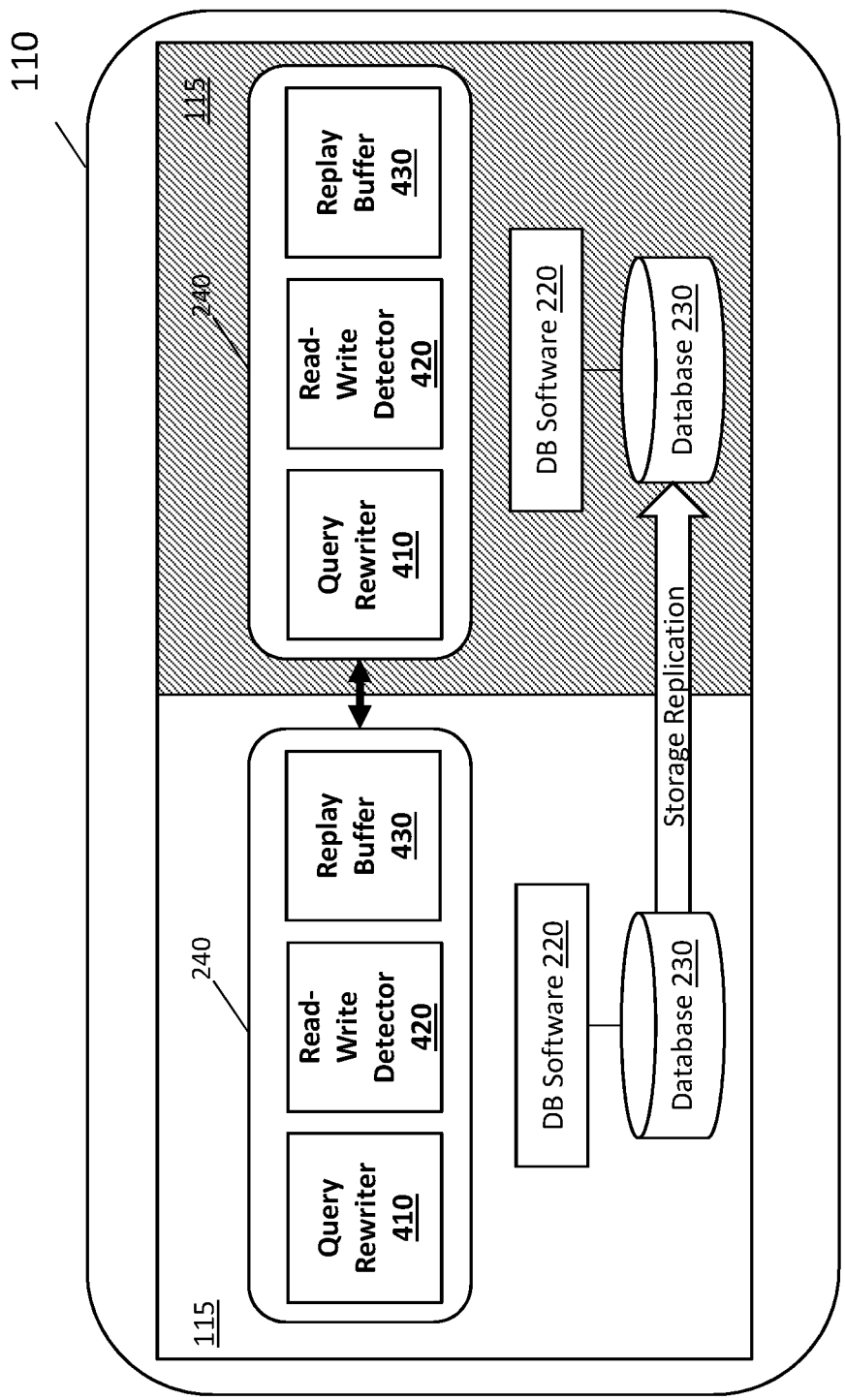
FIG. 4 depicts a block diagram of a structure of an update controller according to one or more embodiments of the present invention.

FIG. 3 depicts a flowchart of a method for applying software updates without any outage according to one or more embodiments of the present invention. FIG. 4 depicts a block diagram of a structure of the update controller 240 according to one or more embodiments of the present invention. The method 300 from FIG. 3 is depicted in conjunction with the description of the example structure depicted in FIG. 4.

Consider that the database software 220 is to be updated. In one or more embodiments of the present invention, the controller 130 uses one of the other servers 115 as the secondary server 115 when updating the database software 220 without any outage according to one or more embodiments of the present invention. The secondary server 115 can be a predetermined server 115. Alternatively, or in addition, in one or more embodiments of the present invention, the secondary server 115 can be any of the servers 115 that the controller 130 selects based on certain specified criteria, or randomly.

The method 300 includes receiving, by the controller 130, a maintenance request, at 310. The maintenance request can be part of a request to maintain the database software 220 of all of the servers 115 in the DBMS 110. For example, the maintenance request can be to update the database software 220 and/or the database 230, such as a security patch, a bug-fix, an upgrade, or any other such changes to the database software 220. The update can include updating the computer-executable instructions of the database software 220. Alternatively, or in addition, the update can include changing the structure of the database 230. For example, the structure of the database 230 can be changed by organizing the data in the database 230 in a different manner. For example, in the case where the database 230 is a relational database, a table in the database 230 may be split into multiple different tables, or multiple tables may be combined into a single table. In other examples, the indices of one or more tables may be changed or updated. Alternatively, or in addition, one or more tables may be added, deleted, edited, etc. It is understood that other changes to the database 230 can be made in one or more embodiments of the present invention.

The update controller 240 initiates the secondary server 115, at block 320. In one or more embodiments of the present invention, the secondary server 115 is initiated in silent mode, i.e., the service IP address 112 of the DBMS 110 is not mapped to the management IP address of the secondary server 115 at this time.

The controller 130, further, replicates the database 230 of the primary server 115 to the secondary server 115 and updates the secondary server 115, at block 330. The replication includes creating a snapshot of the primary server 115 and transferring the snapshot to the secondary server 115, at 332. For example, creating the snapshot includes selecting one or more database files from the database 230. These files are transferred to the database 230 of the secondary server 115. Replicating the database 230 from the primary server to the secondary server 115 can be performed using one or more techniques that are known or can be developed in the future without affecting the features of one or more embodiments of the present invention. In one or more embodiments of the present invention, the data from the primary server 115 is continuously replicated to the secondary server 115 so that the time required to transfer the data for an update can be reduced to the duration required to only copy changes since the most recent data transfer.

In one or more embodiments of the present invention, the secondary server 115 is updated according to the maintenance request. For example, the database software 220 and/or the database 230 of the secondary server 115 are updated as per the maintenance request. In one or more examples, the maintenance request can include a computer program that installs or makes the update to the database software 220 and/or the database 230.

Figure 5:
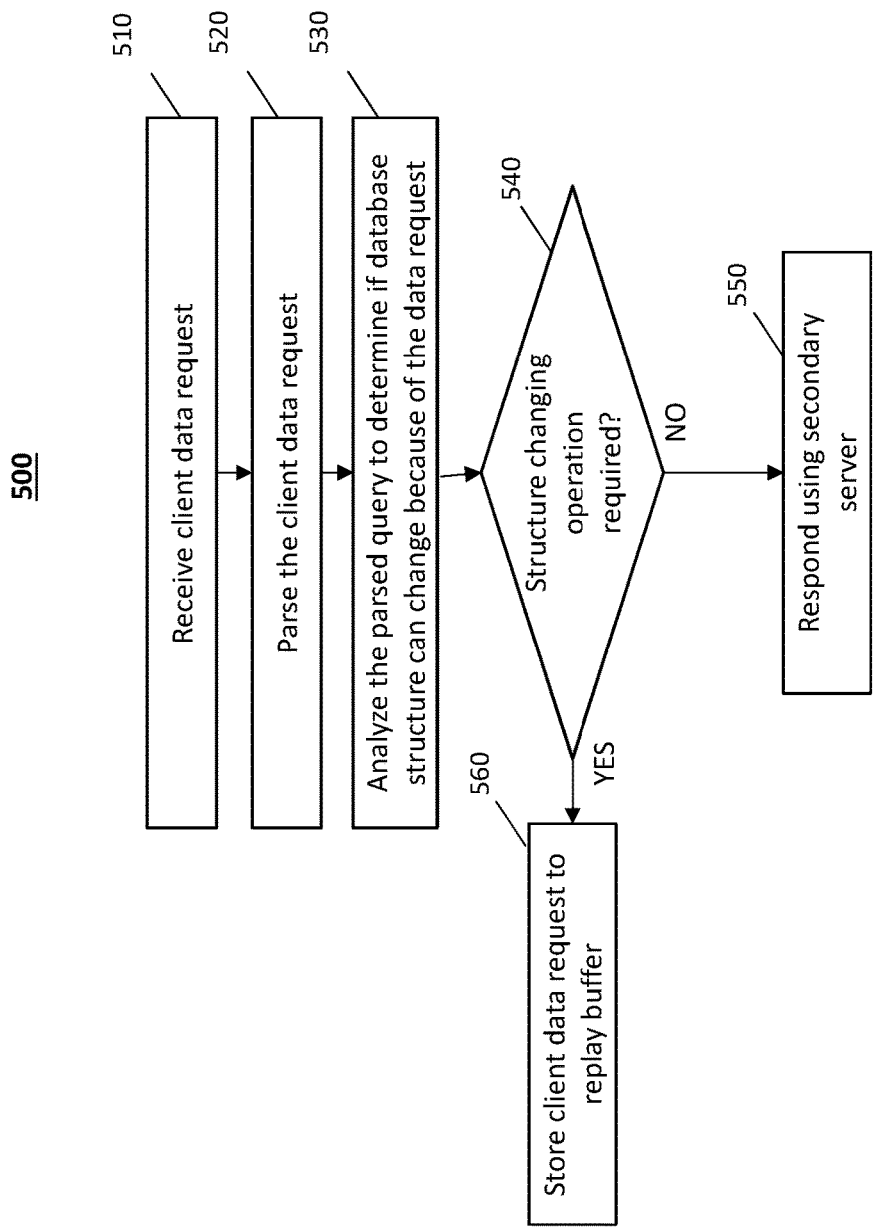
FIG. 5 depicts a flowchart of a method for caching client data requests in a replay buffer according to one or more embodiments of the present invention.

Further, the replication includes initiating a replay buffer 430 (see FIG. 4) of the primary server 115, at block 334. The replay buffer 430 is a memory device or a portion of memory that is allocated for the update controller 240 to use. The update controller 240 caches client data requests that are received by the primary server 115 during the transfer of data to the secondary server 115, at block 346. FIG. 5 depicts a flowchart of a method 500 for caching client data requests in the replay buffer 430 according to one or more embodiments of the present invention. The method 500 includes receiving a client data request, at block 510. A query rewriter 410 of the update controller 240 parses the received client data request, at block 520. The parsing can include identifying one or more variables/data structures to access to complete the client data request. The parsing further includes identifying an operation to be performed, e.g., read data, write/edit data, read metadata, write/edit metadata, and the like in the database 230 of the primary server 115.

The method 500 further includes determining, by the read-write detector 420, whether the client data request changes the database 230 of the primary server 115, at block 530. For example, the client data request can be a write operation that changes the data in the database 230. Alternatively, or in addition, the client data request can be a change to the metadata of the database 230. For example, the client data request can be a change to the structure in which the data is stored in the database 230, for example, tables, graphs, views, etc. in the database 230. The query rewriter 410 and the read-write detector 420 operate in this manner regardless of the query language used by the client request.

If a structure changing operation is required to process the client data request, the update controller 240 stores the client data request to the replay buffer 430, at blocks 540 and 560. Alternatively, if database structure is not being updated, the update controller 240 passes the client data request to be processed by the database software 220 of the secondary server 115, at blocks 540 and 550. The client data requests are stored in the replay buffer 430 in the sequence in which they are received. Further, the client data requests from the replay buffer 430 are executed in the sequence in which they are stored. Each query has a timestamp, and the DBMS 110 ensures that RAW hazards (dependent reads after writes) are processed correctly using known techniques. Embodiments of the present invention do not alter how the DBMS maintains different levels of isolation/consistency guarantees. Concurrency control mechanisms used by the DBMS 110 can include locking with two-phase locking (2PL), multi-version concurrency control (MVCC), optimistic mechanisms with potential transaction rollback if a conflict is detected, and other such techniques.

Referring back to FIG. 4, once the data from the primary server 115 has been copied to the database 230 of the secondary server 115, the update controller 240 of the primary server 115 communicates with the update controller 240 of the secondary server 115 to update the database 230 of the secondary server 115, at block 338. The update controller 240 of the secondary server 115, in one or more embodiments of the present invention, updates the database 230 by executing the queries that are cached in the replay buffer 430. In one or more embodiments of the present invention, the update controller 240 delays incoming writes to facilitate completing the queries in the replay buffer 430. By throttling updates to the database 230 in this way, the replay buffer 430 has a lower incoming rate than the rate at which the queries stored in the replay buffer 430 are executed. Accordingly, delaying the writes facilitates the replay buffer 430 to be drained faster so that the stored queries can be executed. The delay can be a predetermined delay. Alternatively, or in addition, the delay can be caused by not acknowledging an incoming write transaction for a predetermined number of times, for example, for the first two, four, or any other predetermined number of times. Alternatively, or in addition, the delay can be incurred by returning a predetermined error code in response to receiving the write transaction command from a client application. The returned error codes are predetermined, which are known to cause the write transaction to be repeated. Such error codes are returned to the client application for a predetermined number of times, for example, for the first two, four, or any other predetermined number of times.

The method 300 further includes disabling, by the update controller 240, writes to the database 230 in the primary server 115, at block 340. The controller 130 changes the secondary server 115 to active mode at this time and, substantially concurrently, changes the primary server 115 to read-only mode, at block 350. Changing the secondary server 115 to active mode includes mapping the service IP address 112 to the management IP address of the secondary server 115. Changing the primary server 115 to read-only mode includes removing the earlier mapping of the IP service address 112 with the management IP address of the primary server 115. In one or more embodiments of the present invention, the mapping can also use a media access control (MAC) address, or any other unique identifier of the primary server 115 and the secondary server 115 when mapping the service IP address 112. In this manner, the client devices 120 always are communicating with the same network device when sending/receiving data to/from the DBMS 110.

Any subsequent client data request is responded to by the database software 220 of the secondary server 115 using the replicated database 230, at block 360. The method 500 further includes confirming that any client data request that was directed to the primary server 115 has been handled, at block 370. For example, these can be client data requests that the primary server 115 started working on before the update process (method 300) began. If there are any queued client data requests at the primary server 115, they are responded to, at block 375. For example, in the case of read/access requests, the client data requests are directed to the secondary server 115. Alternatively, in the case of write related requests, the queries are cached in the replay buffer 430 and executed by the secondary server 115.

Once all queued client data requests at the primary server 115 have been completed, the method 400 includes updating and restarting the primary server 115, at block 380. Updating can include changing the database software 220 of the primary server 115. The update can also include updating the database 230 to a newer structure, e.g., adding, editing, removing metadata, changing data structures used, and the like.

Once the primary server 115 is back online, the operations of the method 400 are reverted to reinstate the primary server 115, at block 390. Here, the database 230 from the secondary server 115 is replicated to the primary server 115, and client data requests are cached in the replay buffer 430 of the secondary server 115 during this reverting process. Once the data is replicated into the primary server 115, and the queries from replay buffer 430 executed on the primary server 115, the mapping of the IP address 112 is changed back to the management IP address of the primary server 115, and changing it to active mode. The secondary server 115 is changed to a passive or suspended mode.

Embodiments of the present invention accordingly facilitate updating the primary server 115 of the DBMS 110 without any downtime to the client devices 120. The update can include a complete change of internal representation in one or more embodiments of the present invention. Further, one or more embodiments of the present invention do not require that the DBMS 110 supports multiple versions of databases. By managing the mapping of the IP address 112, one or more embodiments of the present invention facilitate replicating the database into the temporary server and continuing to handle client data requests, while the update is being applied to the primary server. Further, for one or more embodiments of the present invention to function, the primary and secondary servers do not have to be operating on synchronized clocks or have other such restrictions. The two servers can operate asynchronously, and also do not have to be part of the same cluster.

Figure 6:
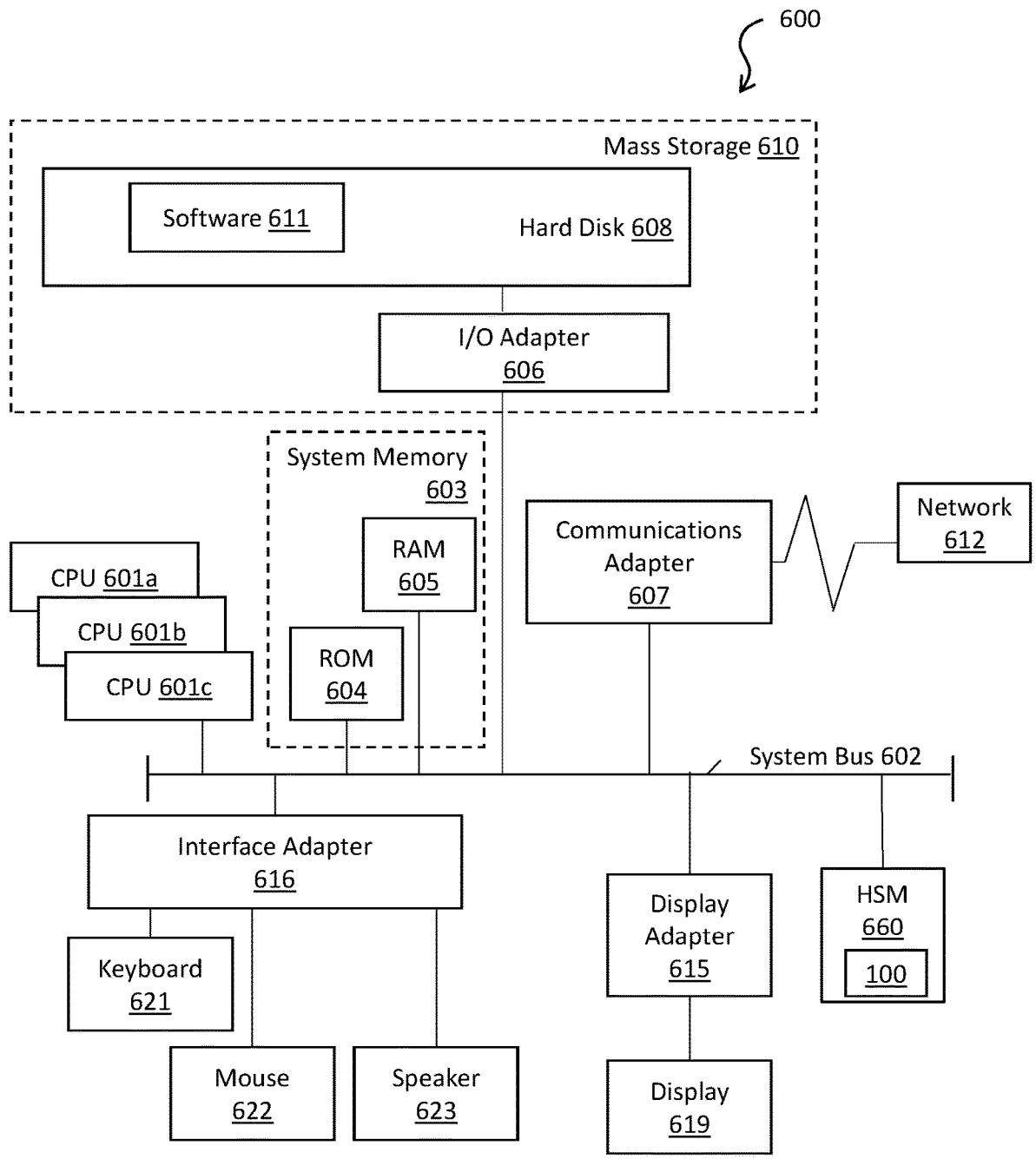
FIG. 6 depicts a computer system that can implement one or more embodiments of the present invention.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. The computer system 600 can be any component that is depicted in FIG. 1. For example, computer system 600 can be a server, a client device, or a DBMS.

Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 501a, 501b, 501c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission medium (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for seamlessly performing a maintenance operation on a stateful system, the method comprising:
   mapping a network address of the stateful system to a primary server that uses a primary database to respond to incoming data requests to the stateful system, the incoming data requests being directed to the primary server because of the mapping; and
   in response to receiving a maintenance request for the stateful system:

replicating the primary database to a secondary database of a secondary server, wherein the primary server and the secondary server are distinct nodes of a server cluster;

updating the secondary server according to the maintenance request;

caching, in a replay buffer of the primary server, subsequent data requests that are received during the replicating;

executing, after the replicating, the data requests from the replay buffer by the secondary server using the secondary database; and executing a first incoming data request that is received during the execution of the data requests from the replay buffer comprises:

determining that the first incoming data request requires a change to the structure of the primary database by parsing the first incoming data request and identifying one or more keywords indicative of a command to change the structure of the primary database and not to change data in the primary database; and based on a determination that the first incoming data request changes the structure of the primary database, not responding to the first incoming data request, and adding the first incoming data request into the replay buffer, or based on a determination that the first incoming data request is a query that changes or adds the data but that does not change the structure of the primary database, responding to the first incoming data request using the secondary database;

disabling write operations to the primary server at time to switch to the secondary server;

mapping the network address of the stateful system to the secondary server for directing subsequent incoming data requests to the secondary server;

updating the primary server according to the maintenance request; and reinstating the primary server by mapping the network address of the stateful system to the primary server and enabling the write operations.

2. The computer-implemented method of claim 1, wherein the maintenance request comprises computer executable instructions to update a structure of the primary database.

3. The computer-implemented method of claim 1, wherein reinstating the primary server further includes:

replicating the secondary database to the primary database;

caching, in a replay buffer of the secondary server, incoming data requests that are received by the secondary server during the replicating; and executing, after the replicating, the incoming data requests, from the replay buffer of the secondary server, by the primary server.

4. The computer-implemented method of claim 1, wherein mapping the network address of the stateful system to the primary server comprises routing the network address to an internal network address of the primary server.

5. The computer-implemented method of claim 4, wherein mapping the network address of the stateful system to the primary server further comprises routing the network address to a media access control address of the primary server.

6. A stateful system comprising:
a primary server;
a secondary server, which is distinct from the primary server; and
at least one processing unit coupled with the primary server and the secondary server, the at least one processing unit is configured to perform a method comprising:

mapping a network address of the stateful system to the primary server that uses a primary database to respond to incoming data requests to the stateful system, the incoming data requests being directed to the primary server because of the mapping; and in response to receiving a maintenance request for the stateful system:

replicating the primary database to a secondary database of the secondary server;

updating the secondary server according to the maintenance request;

caching, in a replay buffer of the primary server, subsequent data requests that are received during the replicating;

executing, after the replicating, the data requests from the replay buffer by the secondary server using the secondary database; and executing a first incoming data request that is received during the execution of the data requests from the replay buffer comprises:

determining that the first incoming data request requires a change to the structure of the primary database by parsing the first incoming data request and identifying one or more keywords indicative of a command to change the structure of the primary database by changing a metadata of the primary database and not changing data in the primary database; and based on a determination that the first incoming data request changes the structure of the primary database, adding the first incoming data request into the replay buffer without executing the first incoming data request, or based on a determination that the first incoming data request is a query that changes or adds data and does not change the structure of the primary database, responding to the first incoming data request using the secondary database;

disabling write operations to the primary server at the time to switch to the secondary server;

mapping the network address of the stateful system to the secondary server for directing subsequent incoming data requests to the secondary server;

updating the primary server according to the maintenance request; and reinstating the primary server by mapping the network address of the stateful system to the primary server and enabling the write operations.

7. The stateful system of claim 6, wherein the maintenance request comprises computer executable instructions to update a structure of the primary database.

8. The stateful system of claim 6, wherein reinstating the primary server further includes:

replicating the secondary database to the primary database;

caching, in a replay buffer of the secondary server, incoming data requests that are received by the secondary server during the replicating; and executing, after the replicating, the incoming data requests, from the replay buffer of the secondary server, by the primary server.

9. The stateful system of claim 6, wherein mapping the network address of the stateful system to the primary server comprises routing the network address to an internal network address of the primary server.

10. The stateful system of claim 9, wherein mapping the network address of the stateful system to the primary server further comprises, routing the network address to a media access control address of the primary server.

11. A computer program product for seamlessly performing a maintenance operation on a stateful system, the computer program product comprising a computer readable storage medium readable by one or more processing circuits, the computer readable storage medium storing instructions executable by the one or more processing circuits to cause a method to be performed, the method comprising:
  mapping a network address of the stateful system to a primary server that uses a primary database to respond to incoming data requests to the stateful system, the incoming data requests being directed to the primary server because of the mapping; and
  in response to receiving a maintenance request for the stateful system:
    replicating the primary database to a secondary database of a secondary server, wherein the primary server and the secondary server are distinct nodes of a server cluster;
    updating the secondary server according to the maintenance request;
    caching, in a replay buffer of the primary server, subsequent data requests that are received during the replicating;
    executing, after the replicating, the data requests from the replay buffer by the secondary server using the secondary database; and
    executing a first incoming data request that is received during the execution of the data requests from the replay buffer comprises:
      determining that the first incoming data request requires a change to the structure of the primary database by parsing the first incoming data request and identifying one or more keywords indicative of a command to change the structure of the primary database the structure being different from data in the primary database, wherein the structure represents how the data is organized in the primary database; and
      based on a determination that the first incoming data request changes the structure of the primary database, adding the first incoming data request into the replay buffer without executing the first incoming data request, or
      based on a determination that the first incoming data request is a query that changes or adds data and does not change the structure of the primary database, responding to the first incoming data request using the secondary database;
    disabling write operations to the primary server at the time to switch to the secondary server;
    mapping the network address of the stateful system to the secondary server for directing subsequent incoming data requests to the secondary server;
    updating the primary server according to the maintenance request; and
    reinstating the primary server by mapping the network address of the stateful system to the primary server and enabling the write operations.

12. The computer program product of claim 11, wherein the maintenance request comprises computer executable instructions to update a structure of the primary database.

13. The computer program product of claim 11, wherein reinstating the primary server further includes:
  replicating the secondary database to the primary database;
  caching, in a replay buffer of the secondary server, incoming data requests that are received by the secondary server during the replicating; and
  executing, after the replicating, the incoming data requests, from the replay buffer of the secondary server, by the primary server.

14. The computer program product of claim 11, wherein mapping the network address of the stateful system to the primary server comprises routing the network address to an internal network address of the primary server.

* * * * *